T. F. EWTON & F. E. WALDROP.
VEGETABLE CURING PLANT.
APPLICATION FILED FEB. 4, 1918.

1,284,628.

Patented Nov. 12, 1918.
2 SHEETS—SHEET 1.

WITNESS
C. A. Ellis

INVENTORS
T. F. Ewton
F. E. Waldrop
BY Jack A. Athly
ATTORNEY.

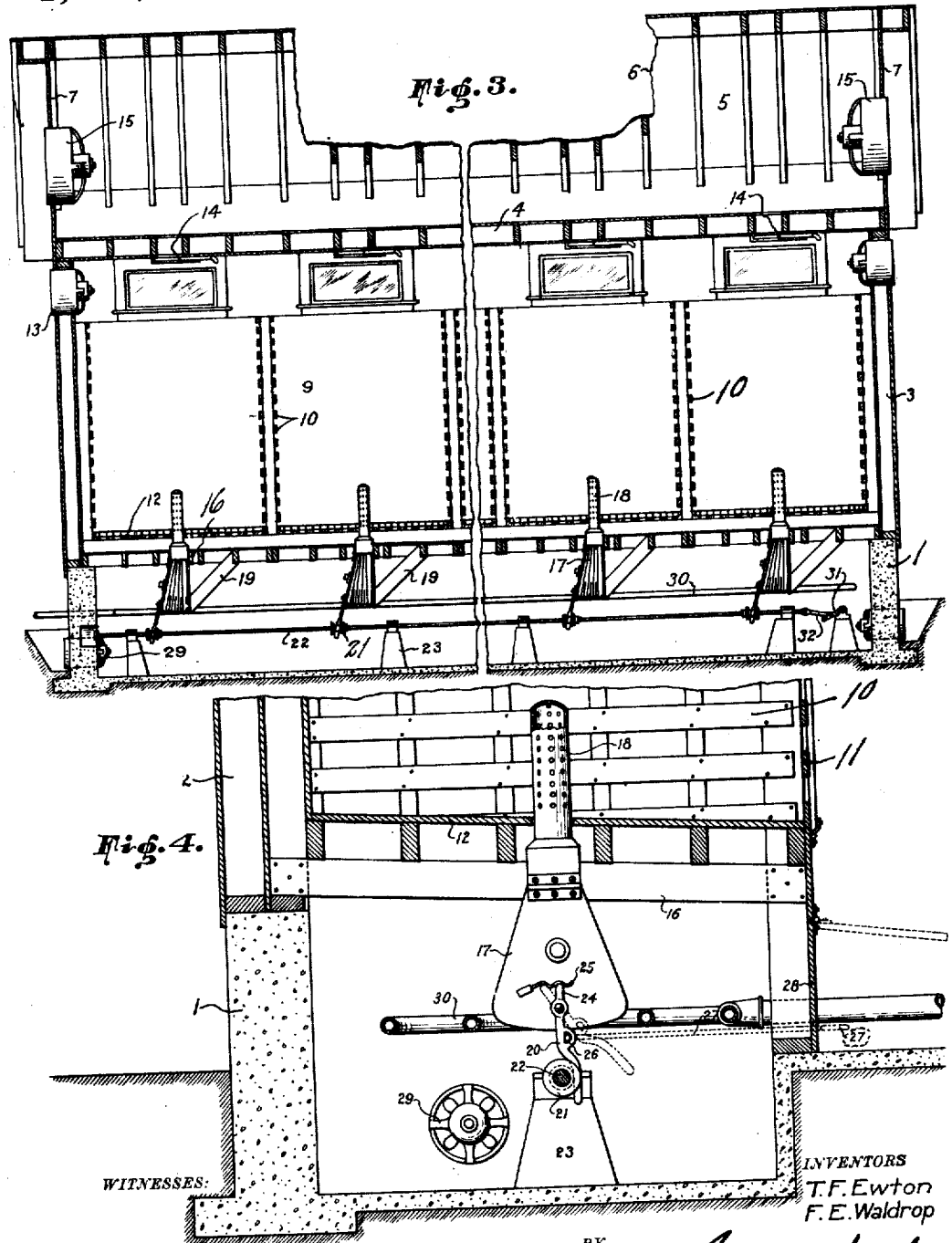

UNITED STATES PATENT OFFICE.

THOMAS F. EWTON, OF DALLAS, AND FRANCES E. WALDROP, OF LONGVIEW, TEXAS; SAID WALDROP ASSIGNOR TO SAID EWTON.

VEGETABLE-CURING PLANT.

1,284,628.　　　　Specification of Letters Patent.　　Patented Nov. 12, 1918.

Application filed February 4, 1918. Serial No. 215,258.

*To all whom it may concern:*

Be it known that we, THOMAS F. EWTON and FRANCES E. WALDROP, citizens of the United States, residing at Dallas and Longview, in the counties of Dallas and Gregg and State of Texas, have invented certain new and useful Improvements in Vegetable-Curing Plants, of which the following is a specification.

This invention pertains to the curing of vegetables.

Several apparatuses have been designed for curing vegetables by subjecting the same to heated air of a given temperature for a period or periods. The air is circulated and it is customary to deposit the vegetables in bins and therefore it is also necessary to control the direct supply of air to each bin. So far as we have been able to observe no apparatus has been produced whereby a given volume of air may be individually supplied to each bin thus making each bin a unit, and the main feature of our invention therefore is to provide a unit system of curing. In carrying out the invention it is proposed to construct a curing house with a plurality of bins and having provision for admitting and exhausting air whereby circulation may be had. The air, of course, is to be heated and the manner of heating is optional. It is proposed to provide at each bin means for forcing air into that bin, however the air used by said means must first be heated and each air forcing means must be arranged to be made dormant when its use is not desired. We claim that by the unit system or the supplying of a given volume of air heated to a given temperature, constantly supplied to the vegetables in a particular bin with a minimum fluctuation, will not only cure the vegetables more readily and more uniformly but will reduce the deterioration and substantially prevent decay.

Figure 1:
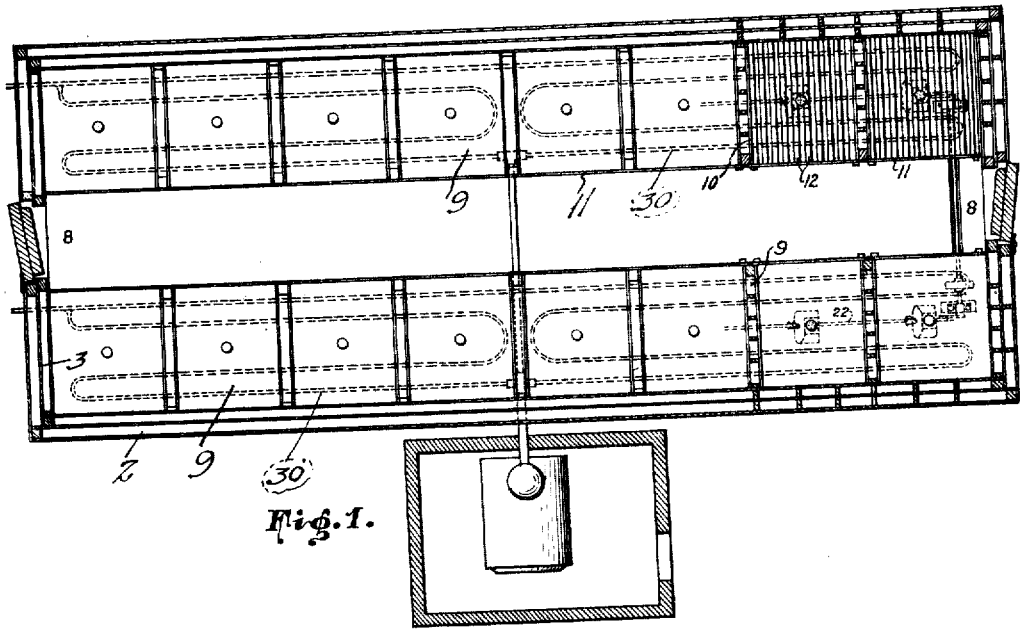
Figure 2:
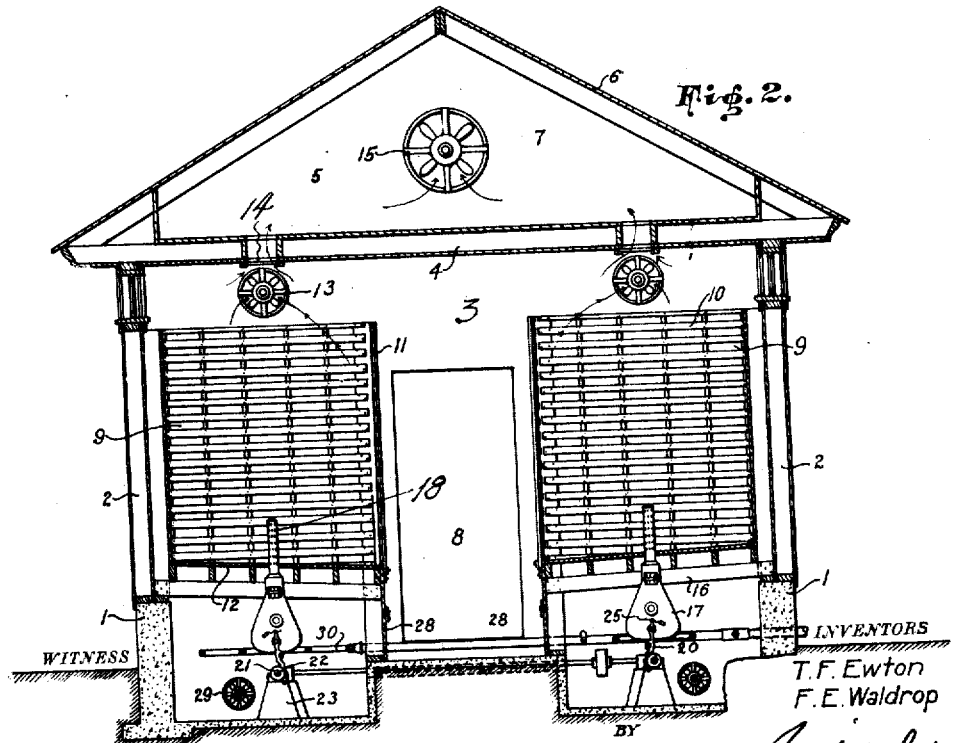

The invention will be more readily understood from a reading of the following specification and by reference to the accompanying drawings, in which an example of the invention is illustrated, and wherein, Figure 1 is a horizontal sectional view showing a heating means disposed in a house constructed in accordance with this invention, Fig. 2 is a transverse sectional view of said house, Fig. 3 is a longitudinal sectional view of the same, and Fig. 4 is a transverse sectional detail of one of the bins.

In the drawings the numeral 1 designates a foundation on which upright side walls 2 and end walls 3 are built. These walls are constructed as insulators so as to retain the heat within the building. An insulating ceiling 4 is provided above which is arranged a loft 5 covered by a roof 6 having gables 7 at each end. The building is provided with a central aisle 8 on each side of which bins 9 are arranged. The bins are separated by vertical upright slatted walls 10 and each has a front 11 at the aisle composed of horizontal bars which may be removed or placed one at a time in emptying or filling the bins. Each bin has a slatted floor 12 inclined downward toward the aisle. The bins do not extend to the ceiling and each end wall 3 is provided with exhaust fans 13 above each row of bins. Dampers 14 are provided in the ceiling over each bin, whereby communication with the loft 5 may be established or cut off as desired. This is for the purpose of ventilation and ventilating fans 15 are mounted in the gable 7.

Below the floors 12 are joists 16 supporting the same and under the center of each bin a bellows 17 of the ordinary construction is supported by the joists and depends therefrom. Each bellows is connected with a perforated nozzle 18 extending up through the floor 12 as shown. One wing of each bellows is rigidly fastened in position by a brace 19 while the other wing carries a depending latch 20 pivoted thereon. Each latch is offset so as to engage the flanged collar 21 fixed on a reciprocating rod 22 supported in standards 23 longitudinally of the house. Each latch has a lug 24 projecting above its pivot point and engaging a retaining spring 25 and is also provided below its pivot point with an eye 26. When it is desired to discontinue the operation of a bellows a hook 27 is inserted through an opening 28 from the aisle and engaged in the eye 26. Then by pulling on the hook the latch is swung out of its respective collar and so held by the part 25.

At each end foundation 1 intake fans or devices 29 are arranged for supplying air to the space under the floors 12. This air must have a heating temperature and for heating the same prior to forcing it into the bins we have shown coils of steam pipe 30 located adjacent to the bellows. It is to be understood that any means of heating air or supplying heated air could be used. The rod 22 is reciprocated by means of a crank 31 connected thereto by an adjustable link 32, said crank being driven by suitable means. The fans or devices 13, 15 and 29 may be suitably driven by means not shown.

In curing vegetables such as sweet potatoes the bins 9 are loaded so that the vegetables rest on the floors 12 and surround and cover the nozzles 18. Motion being imparted the rods 22 will be reciprocated and all those bellows whose latches 20 are in engagement with the collars 21 will be operated. Air being admitted through the intakes 29 will be heated by the steam pipes 30 and taken into the bellows which will force said heated air out through their nozzles 18. The air will be forced to travel around the vegetables and those at the bottom of the bin will be treated as well as those at the top. The exhaust outlets 13 will cause a circulation and will carry off the air. Where ventilation is needed the dampers 14 may be opened and ventilation established through the loft 5 and the fans 15. It will be seen that a given volume of air is supplied directly to each bin or cut off therefrom as desired. Such an operation could not be had where air was supplied through a long conduit by nozzles arranged at intervals as the nozzles nearer the source of supply would receive a greater volume. Air admitted and passed over or through the bins in a general way would not be evenly distributed. It will be apparent that each bin is a unit in itself and may be individually controlled and supplied.

The foregoing description and illustration clearly express the invention, but it is to be understood that said illustration is merely an exemplification and the invention may be carried out in various ways.

What we claim is,

1. In a vegetable curing plant, a structure including a plurality of bins, a bellows located under each bin, and mechanism for operating the bellows in unison or operating one or more of the bellows while the others remain dormant.

2. In a vegetable curing plant, a structure including a plurality of bins, a bellows located under each bin, mechanism for operating the bellows in unison or operating one or more of the bellows while the others remain dormant, the structure having provision for supplying heated air to the bellows.

3. In a vegetable curing plant, the combination in a house of a plurality of slatted bins for receiving vegetables, a nozzle projecting upward into each bin, a bellows connected with each nozzle, a common operating device for the bellows extending under the bins, and means connected with each bellows for connecting or disconnecting same with the common operating means whereby each bellows is individually operated or held dormant.

4. In a vegetable curing plant, the combination in a house of a plurality of slatted bins for receiving vegetables, a nozzle projecting upward into each bin, a bellows connected with each nozzle extending under the bins, means connected with each bellows for connecting or disconnecting same with the common operating means whereby each bellows is individually operated or held dormant, and means for supplying heated air to the bellows.

In testimony whereof we affix our signatures.

THOMAS F. EWTON.
FRANCES E. WALDROP.